Jan. 8, 1957  H. A. STAMPER ET AL  2,777,070
SERVO COMPASS
Filed May 5, 1953  2 Sheets-Sheet 2
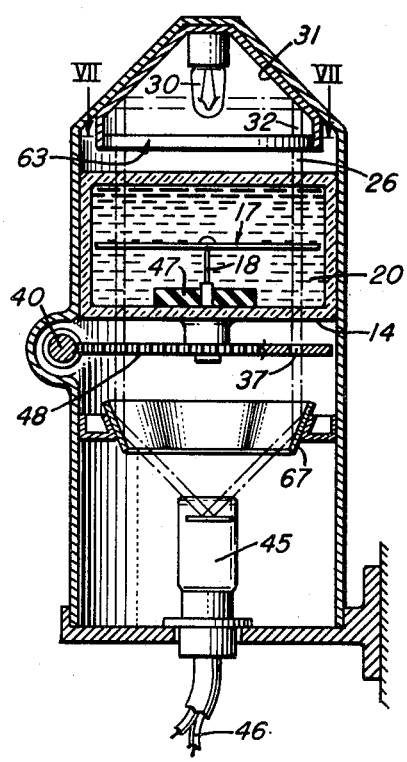
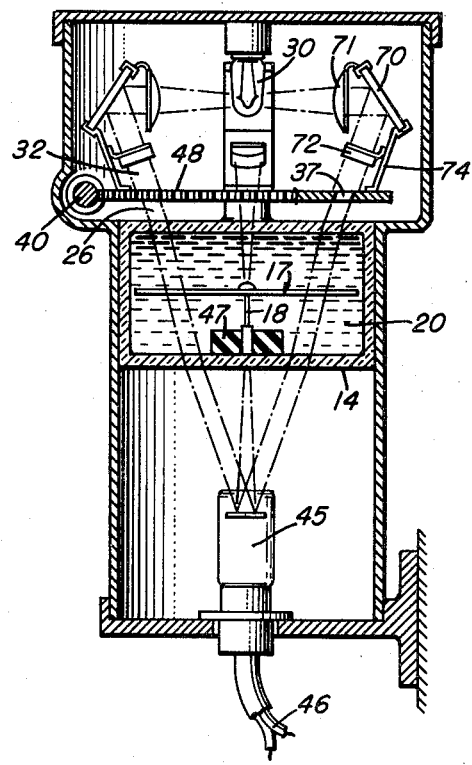
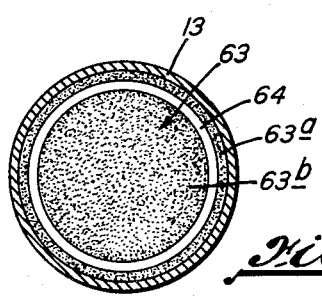
H. A. Stamper
F. H. Stamper
  INVENTORS
BY *Ellwoodbury*
  ATTORNEY

United States Patent Office 2,777,070
Patented Jan. 8, 1957

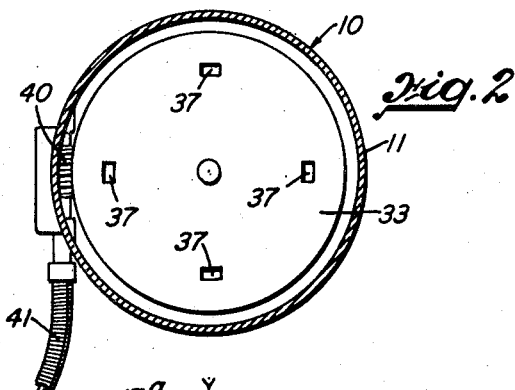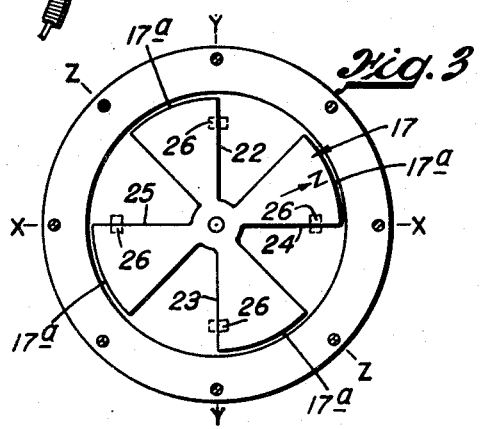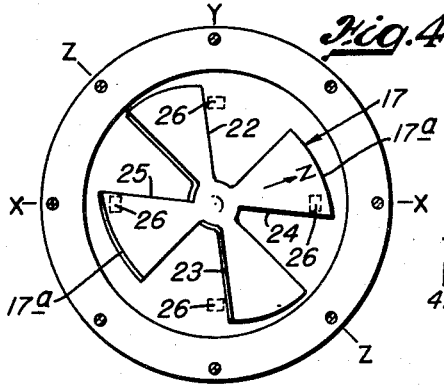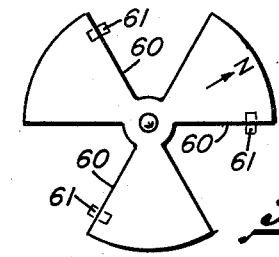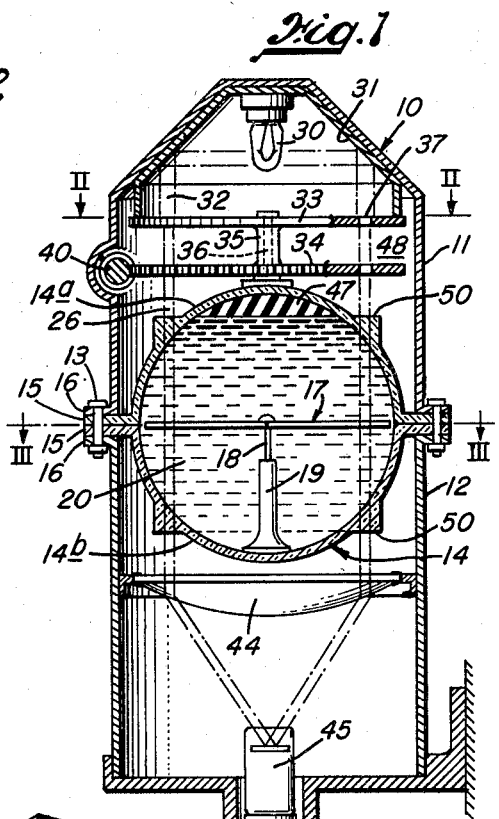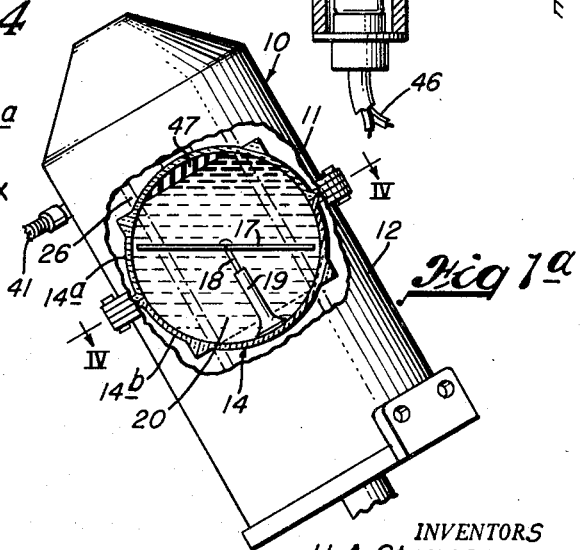

2,777,070
SERVO COMPASS

Hamilton A. Stamper and Furman Harrison Stamper, Los Angeles, Calif., assignors to Bendix Aviation Corporation, North Hollywood, Calif., a corporation of Delaware Application May 5, 1953, Serial No. 353,214

14 Claims. (Cl. 250—233)

This invention relates to compasses for controlling automatic steering mechanisms to maintain watercraft or aircraft on a predetermined course. Such compasses are herein called "servo compasses" to distinguish them from compasses that merely give a visual indication of direction.

An object of the invention is to simplify and reduce the cost of servo compasses for automatic pilots on crafts subject to pitching and rolling.

Another object is to increase the sensitivity of an optical type servo compass.

Other more specific objects and features of the invention will appear from the description to follow.

The invention relates to a much used type of servo compass employing an optical system in which a light beam is projected past a radial edge on the compass card onto a photoelectric tube so that a change in direction varies the amount of light reaching the photo tube, thereby varying the electric output of the tube to actuate a power steering system in such direction as to put the craft back on course. In all such prior servo compasses known to us, the entire compass assembly has been mounted in gimbals so that rolling of the craft did not change the vertical angle between the compass card and the light beam, it being recognized that such changes introduced errors. It was obvious that simplification and reduction in cost could be effected by eliminating the gimbals, but it was not possible to do this with the known optical systems.

The present invention makes possible elimination of the gimbals by the introduction of a new optical system that produces substantially no errors in response to changes in the vertical angle between the optical system and the compass card. As a result, only the compass card need be so supported as to remain in a horizontal position, the remainder of the compass being rigidly attached to the craft.

The new optical system differs from the old ones in employing a plurality of light beams and a plurality of cooperating edges on the card, the beams and edges being so distributed around the axis of the compass that tilting of the compass from normal position in such direction as to increase the interception of one beam by the associated edge of the compass card decreases the interception of another beam or beams, thereby producing no serious net change in the total light reaching the photocell. The result is obtainable with two beams spaced 90° apart about the compass axis or with three or more beams symmetrically spaced about the axis.

A full understanding of the invention may be had from the following detailed description when read in connection with the drawing, in which:

Fig. 1 is a vertical sectional view through a servo compass in accordance with the invention, with the parts in normal position;

Fig. 1a is a view similar to Fig. 1 but showing the relation of the parts when the frame is tilted out of normal vertical position;

Fig. 2 is a horizontal cross section in the plane II—II of Fig. 1;

Fig. 3 is a cross section in the plane III—III of Fig. 1 showing the normal relation between the compass card and the light beams;

Fig. 4 is a cross section in the plane IV—IV of Fig. 1a showing the relation of the compass card to the light beams when the axis of the compass is tilted out of normal vertical position;

Fig. 5 is a plan view of an alternative compass card;

Fig. 6 is a view similar to Fig. 1 showing a modification of the structure shown in Fig. 1;

Fig. 7 is a cross section in the plane VII—VII of Fig. 6; and

Fig. 8 is a view similar to Figs. 1 and 6 showing still another modification.

Referring first to Fig. 1, the servo compass therein disclosed comprises a frame 10 having a normally vertical axis and consisting of upper and lower casing sections 11 and 12 respectively, joined together by bolts 13, which bolts also serve to secure a compass bowl 14 in fixed position with respect to the frame. Thus the compass bowl 14 is formed in two halves 14a and 14b, each substantially semi-spherical and having an outwardly extending equatorial flange, which flanges 15 are compressed together between corresponding flanges 16 on the adjoining ends of the casing section 11 and 12 respectively.

The compass bowl 14 contains a compass card 17 which is pivotally supported at its center in the usual manner by an upstanding pivot needle 18 which extends from a pedestal 19 secured to the lower half of the bowl 14. The card 17 may be of any permanent magnetic material magnetized to orient itself with the earth's magnetic field. The bowl 14 is substantially filled with a liquid 20 (in accordance with the usual practice) to dampen the movements of the compass card 17 in response to rolling of the craft on which the compass is mounted. The frame 10 is to be rigidly secured at its base to the craft on which it is used, for movement therewith in all directions.

As shown in Fig. 3, the compass card 17 has four blades 17a having active radial edges 22, 23, 24 and 25, each positioned on the clockwise margin of its associated blade 17a. The widths of the blades are not critical, but they are shown of 45° arcuate extent to provide blade arcs corresponding to the arcs between the blades. The edges 22, 23, 24 and 25 are normally positioned in partial intercepting relation with four identical light beams 26 which are projected vertically past the card from a beam-projecting means supported by the frame 10.

Thus, referring to Fig. 1, the beam-projecting means comprises a light source 30, shown as a lamp mounted in the upper end of the housing 10, an annular reflector 31, and a light-blocking means 48 therebelow. Thus a portion of the light from the lamp 30 is reflected by the conical mirror 31 in the form of a vertical hollow beam 32. This beam 32 is intercepted by the light-blocking means 48 consisting of a pair of disks 33 and 34 secured together by a hub 35, which is supported on a vertical shaft 36 extending from the upper end of the compass bowl 14. These disks 33 and 34 are of opaque material, but have four windows 37 juxtaposed to each other and spaced 90° apart about the axis of the frame 10, so that the disks block all of the light directed downwardly thereagainst except at the apertures or windows 37, which permit the passage of the beams 26 referred to in connection with Fig. 3. The lower disk 34 is shown provided with gear teeth on its edge meshing with a worm 40 (Fig. 2) which may be rotated by means of a flexible shaft 41 from a remote point of control, to adjust the orientation of the beams 26 about the frame axis.

The four beams 26 enter the upper half of the bowl 14, pass the compass card 17, and pass out of the lower half of the bowl 14 without changing their direction. Below the bowl 14, they impinge on light-collecting means shown as a lens 44 which refracts them onto a photoelectric cell 45 positioned in the lower part of the frame 10. Photocell 45 has electrical leads 46 which may be extended to an automatic steering apparatus responsive to variations in current supplied thereto.

The upper and lower halves 14a and 14b of the compass bowl 14 are each formed with a flat annular face 50 in the path of and perpendicular to the light beams 26, regardless of the orientation of the beams. Hence no refraction of the light beams occurs at the points of entry to and exit from the bowl 14. Likewise, no refraction results from passage of the light beams between the inner surface of the bowl 14 and the liquid 20 therein, despite the high angle between the light beams and the inner surface, because the liquid 20 and the material of the bowl 50 are so chosen as to have substantially the same refractive index. Thus the bowl material may be cellulose acetate, and the liquid 20 may be kerosene, both of which have a refractive index of approximately 1.5.

It will be apparent from the foregoing description that any departure from course of the craft to which the frame is secured shifts the rest of the compass assembly with respect to the compass card 17; i. e., either increasing or decreasing, in the same sense, the extent to which all the active edges 22, 23, 24 and 25 intercept the four light beams 26. This varies the total amount of light falling on the photocell 45 and produces a change in the electric current flowing in the leads 46 to the steering mechanism. As is well known, the steering mechanism is so designed as to change the course of the craft in such direction as to restore it to its former position, whereupon the intensity of the light falling on the cell 45 is restored to normal.

Now consider what takes place when the axis of the frame 10 is shifted from the vertical in various directions. It will be apparent from inspection of Fig. 3 that if the vertical axis shifts about either the axis X—X or the axis Y—Y, the extent to which the beams 26 are intercepted will not be altered.

Now, referring to Fig. 4, let it be assumed that the frame 10 rocks about an axis Z—Z intermediate the X and Y axes. Fig. 4 shows the compass card and beams as they would appear looking along the axis of the frame 10, the compass card now being viewed in perspective instead of in plan, and being foreshortened in the direction at right angles to the axis Z—Z. This swings the pair of beams 26 associated with the edges 22 and 23 away from those edges but swings the beams associated with the edges 24 and 25 farther into those edges. The increased amount of light passing edges 22 and 23 to the photocell is substantially neutralized by the decreased amount of light passing the edges 24 and 25, so that a roll condition as shown in Fig. 4 does not cause a false actuation of the steering apparatus.

However, it will be apparent from inspection of Fig. 4 that in the prior systems employing only one beam, the amount of light reaching the photocell would be very substantially varied in response to roll of the compass about the axis Z—Z, either increasing the amount of light or reducing it. It will also be apparent from inspection of Fig. 4 that only two of the light beams need be employed to produce the compensating effect, but they must be separated by 90°. Thus the two beams associated with any two adjacent edges 23 and 24, 24 and 22, 22 and 25, or 25 and 23 produce mutually neutralizing effects in response to roll.

It is usually desirable to employ four beams and four edges as shown in Figs. 3 and 4, instead of only two beams and two edges, for two reasons. One reason is that the total variation in the light impinging on the cell 45 is increased, and therefore the sensitivity as a whole is increased. The other reason is that in the case of violent agitation the compass card 17 might be shifted bodily off center with respect to the pivot 18, which is located in the axis of the frame. Such shifting would produce a material error if only two adjacent edges such as the edges 23 and 24 were used, but where all four edges 22, 23, 24 and 25 are employed, bodily movement of the card in any direction tends to increase two beams to the same extent that the other two are decreased.

When the spacing between the light intercepting edges of the compass card is 90°, either two edges and two beams or four edges and four beams may be employed. However, the invention is not limited to edges spaced 90° apart. Any number of edges greater than two may be employed, under which conditions they should all be equally spaced about the center of the card. Thus, as shown in Fig. 5, a triple beam system may be employed using three edges 60 intercepting three beams 61. It is found that with this arrangement a deflection of the axis of the frame from the vertical in any direction tends to increase or decrease the interception of one or two beams but correspondingly decrease or increase the interception of the other beams or beam so that the total amount of light reaching the photocell remains substantially unchanged.

The optimum number of beams and edges to use depends on various circumstances. Where the compass is to be used on a small craft that may be subject to very rapid changes of course, a small number of beams is desirable, because the blades of the compass card can then be of substantial arcuate extent and also the spaces between the blades of substantial arcuate extent, so that it would take a very large angular movement of the compass to carry the beams 26 clear across the blades and into working relation with the other edges of the blades. Obviously, if this happened, the compass would work in reverse and would be inorperative to produce any useful result. On the other hand, with relatively large and stable boats or ships where rapid changes of course are practically impossible, a larger number of beams more closely spaced can be employed to give increased sensitivity.

It is desirable that there be no free air within the compass bowl 14, because in the case of violent agitation this air might become mixed with the liquid and interfere with the optical properties thereof. It is therefore desirable to provide within the compass bowl 14 at any convenient point a small mass 47 of resilient compressible material (such as air cell rubber or neoprene) that is impervious to the liquid employed. This permits differential expansion and contraction between the liquid and the bowl 14 by compression or expansion of the resilient compressible mass.

Various modifications of the particular structure shown in Fig. 1 can be made and still obtain the desired immunity to error. Thus it will be apparent from the foregoing description that the immunity to error results from the use of a plurality of control edges on the compass card, and various changes can be made in the particular optical system shown in Fig. 1 while still utilizing this feature.

Thus, as shown in Fig. 6, the light blocking means 48 can be positioned below the compass bowl 14 instead of above it. With this arrangement, there may be a screen 63 interposed between the reflector 31 and the compass bowl 14 for blocking all light emanating downwardly from the lamp 30 and the reflector 31, except the hollow cylindrical beam 32. As shown in Fig. 7, the screen 63 may consist of a body of transparent material such as glass or plastic having coatings 63a and 63b of opaque paint or the like which define an annular clear area 64 in the path of the desired beam 32.

Since the beam 32 is projected directly onto the compass card 17, it passes therethrough onto the light blocking means 48 where all portions of the beam passing the card 17 are blocked except those impinging upon the apertures 37 (Fig. 2). It will be apparent that in normal operation the working edges of the compass card 17 occupy the same positions relative to the apertures 37 as they do in the structure of Fig. 1, which relation is shown in Figs. 3 and 4. The resultant beams passing through the apertures 37 are reflected by an annular mirror 67 onto the photocell 45, the mirror 67 performing the same function as the lens 44 in Fig. 1.

It will be observed that in Fig. 6 the bowl 14 is cylindrical in shape instead of being spherical as in Fig. 1. A spherical bowl represents the most perfect form, because it is least productive of turbulence in the liquid therewithin in response to roll. However, in practice it is found that non-spherical bowls do not have objectionable turbulence characteristics in ordinary use and are more practicable in some respects. Thus where a cylindrical bowl is employed, as shown in Fig. 6, the light enters and leaves the bowl substantially perpendicular to the end surfaces thereof so that no objectionable reflection or refraction results.

Still another modification of the structure of Fig. 1 is shown in Fig. 8. This modification employs a cylindrical bowl 14, the same as shown in Fig. 6, but the light blocking means 48 is positioned above the bowl the same as in Fig. 1. This arrangement differs from both Fig. 1 and Fig. 6 in employing a different beam-forming system, that directs the beams past the compass card 17 in converging relation directly onto the photocell 45, so that no lens or mirror is required below the compass bowl.

The arrangement of Fig. 8 differs essentially from both that of Fig. 1 and that of Fig. 6 in that it employs a separate optical system for forming each beam instead of using the single conical mirror 31. Thus for each beam there is provided a separate plane mirror 70 in the horizontal plane of the lamp 30 and angled to direct the light from the lamp 30 that is intercepted thereby through the aperture 37 past the compass card 17 and directly onto the photocell 45. To increase the amount of light that is concentrated on the working edge of the compass card 17, a pair of condensing lenses 71 and 72 may be employed. The lens 71 may be a spherical lens of such curvature as to tend to concentrate light falling thereon from the lamp 30 into a parallel beam. On the other hand, the lens 72 is preferably a cylindrical lens which concentrates the light into a relatively long narrow beam at the plane of the compass card 17. This increases the sensitivity without decreasing the total amount of light that is controlled.

Each of the assemblies consisting of the lens 71, mirror 70, and lens 72 may be supported by a bracket 74 from the light blocking means 48, so that rotative adjustment of the light blocking means 48 moves the beam-forming lenses and mirrors with it.

Since the beams entering and leaving the compass bowl 14 are at an angle to the upper and lower surfaces of the bowl, some refraction takes place as indicated in Fig. 8, but this refraction is constant and can be readily taken into account in the design of the apparatus, so that it is not objectionable.

Although for the purpose of explaining the invention a particular embodiment thereof has been shown and described, obvious modifications will occur to a person skilled in the art, and we do not desire to be limited to the exact details shown and described.

We claim:

1. A servo compass comprising: a frame having a normally vertical axis but subject to departures from the vertical in any direction; a compass card having a center and means supporting the card with its center substantially in said axis for free rotation with respect to said frame about its said center in a horizontal plane irrespective of deviations of said axis from vertical position; a lamp and a photoelectric means supported by said frame and means for directing light from said lamp past said card to said photoelectric means; light-blocking means on said frame interposed in the path of said light for limiting the light reaching said photocell to a plurality of separate beams angularly spaced about said axis; said card comprising light intercepting means having a plurality of radial edges angularly spaced like said beams and each oriented to normally partially intercept the light of a different one of said beams in the same sense whereby relative rotation between said card and frame produces like variation of the light in all said beams.

2. A device according to claim 1 in which said beams and edges are at least two in number and displaced 90° apart about said axis and said card center respectively.

3. A device according to claim 1 in which said beams and edges are at least three in number and symmetrically spaced about said axis and said card center respectively.

4. A device according to claim 1 in which said lamp is axially positioned on one side of said card, and said means for directing said light comprises: annular light deflecting means coaxial with said axis and angled to deflect light from said source to said card as a beam symmetrical about said axis; said light-blocking means being positioned between said annular deflecting means and said photoelectric means.

5. A device according to claim 4 including means rotatably supporting said light-blocking means for rotation about said axis to adjust the orientation of said beams with respect to said frame.

6. A device according to claim 5 in which said photoelectric means is positioned substantially in said axis on the opposite side of said card from said lamp; and axially symmetrical annular light deflecting means on said opposite side of said card for equally deflecting onto said element all portions of the light in said beams passing said card.

7. A device according to claim 1 in which said means supporting said compass card comprises a transparent bowl fixed to said frame and enclosing said card and substantially filled with a liquid having substantially the same index of refraction as said bowl; means pivotally supporting said card in said bowl; said bowl intersecting the paths of said light beams and having external surfaces substantially normal to said axis in the paths of said light beams.

8. A device according to claim 7 including a resilient compressible body impervious to said liquid in said container and with said liquid completely filling said container.

9. A device according to claim 7 in which said transparent bowl is substantially cylindrical in shape with its axis coincident with said frame axis.

10. A device according to claim 1 in which said light blocking means is positioned between said compass card and said photoelectric means.

11. A device according to claim 10 including a screen positioned between said light-directing means and said compass card, said screen having opaque portions defining an annular window in the path of light from said light-directing means.

12. A device according to claim 1 in which said lamp and said photoelectric means are respectively positioned on opposite sides of said compass card in the axis of said frame, and said light directing means comprises mirror means radially spaced from said lamp and inclined to reflect light from said lamp directly past said card to said photoelectric means.

13. A device according to claim 1 including a cylindrical light deflecting means in the path of each beam between said lamp and said card for contracting said beam at the plane of the card in direction perpendicular to its associated card edge.

14. A servo compass comprising: a frame having an axis which is normally vertical but is subject to departures from the vertical in any direction; a compass card having a center and means supporting the card with its center substantially in said axis for free rotation with respect to said frame about its said center in a horizontal plane, irrespective of deviations of said frame axis from vertical position; a photoelectric means supported by said frame; means supported by said frame for producing and directing a plurality of separate light beams angularly spaced about said axis past said card to said photoelectric means; said card comprising light-intercepting means having a plurality of radial edges angularly spaced like said beams and each oriented to normally partially intercept a different one of said beams in the same sense, whereby relative rotation between said card and frame varies the light in all of said beams in the same sense.

References Cited in the file of this patent

UNITED STATES PATENTS

| | | |
|---|---|---|
| 2,112,504 | Mirfield | Mar. 29, 1938 |
| 2,126,887 | Hodgman et al. | Aug. 16, 1938 |
| 2,432,667 | Kettering et al. | Dec. 16, 1947 |
| 2,576,760 | Jones et al. | Nov. 27, 1951 |